Patented Oct. 12, 1954

2,691,597

UNITED STATES PATENT OFFICE 2,691,597

CERAMIC MATERIAL AND METHOD OF PRODUCING IT

Josef Möllers, Hamburg-Poppenbuttel, Germany, assignor to Hartford National Bank and Trust Company, Hartford, Conn., as trustee No Drawing. Application April 29, 1952, Serial No. 285,043

Claims priority, application Germany June 9, 1951

1 Claim. (Cl. 106—39)

Insulating materials constituted by one or more of the titanates $2CaO.TiO_2$, $3CaO.2TiO_2$, $2SrO.TiO_2$ and/or $3SrO.2TiO_2$ have been known for several years. These materials have a dielectric constant of about 35 to 55 and are differentiated by a low temperature coefficient of the dielectric constant (about $-100 \times 10^{-6}$° C.) and by low dielectric losses (tan $\delta$ smaller than $10 \times 10^{-4}$).

Although these materials are very advantageous they could not be used hitherto for the industry since they require a very high sintering temperature of about 1500° C.

The invention permits of reducing the sintering temperature of such substances to about 1200 to 1350° C. by admixture of zinc and/or cadmium titanates. The insulating material according to the invention consists of a sintered mixture of one or more of the titanates $2CaO.TiO_2$, $3CaO.2TiO_2$, $2SrO.TiO_2$ and/or $3SrO.2TiO_2$, 3 to 50% of one or more of the titanates $ZnO.TiO_2$, $2ZnO.TiO_2$, $CdO.TiO_2$ and/or $2CdO.TiO_2$. The mixture may contain in addition up to 10% of a flux, such as clay or the like.

The manufacture may be started with a mixture either of oxides or of compounds, apt to be converted into oxides, such as carbonates. Since carbonates shrink intensely during sintering, the material is preliminarily calcinated, preferably at 800 to 1200° C., is then ground again and after shaping sintered at 1200 to 1350° C.

According to the invention: e. g. 80 gms. of the calcium titanate having a composition $2CaO.TiO_2$ and 20 gms. zinc-orthotitanate $(2ZnO.TiO_2)$ are mixed and moulded and then sintered at 1300° C. in an oxidising atmosphere, preferably in air. This results in the production of a ceramic material having a dielectric constant of 40, a temperature coefficient of $-80 \times 10^{-6}$° C. and a tan $\delta$ smaller than $10 \times 10^{-4}$.

What I claim is:

A ceramic insulating material consisting essentially of a sintered mixture of 3 to 50% of at least one titanate selected from the group consisting of $ZnO.TiO_2$, $2ZnO.TiO_2$, $CdO.TiO_2$ and $2CdO.TiO_2$, and the remainder being at least one titanate selected from the group consisting of $2CaO.TiO_2$, $3CaO.2TiO_2$, $2SrO.TiO_2$ and $3SrO.2TiO_2$.

References Cited in the file of this patent

UNITED STATES PATENTS

| Number | Name | Date |
|---|---|---|
| 2,277,734 | Wainer et al. | Mar. 31, 1942 |
| 2,436,840 | Wainer | Mar. 2, 1948 |